United States Patent [19]

Husarik et al.

[11] Patent Number: 5,412,955
[45] Date of Patent: May 9, 1995

[54] NON-CONDENSABLE PURGE CONTROL FOR REFRIGERANT RECYCLING SYSTEM

[75] Inventors: Roger L. Husarik, Bartlett; J. Steven Martin, McHenry, both of Ill.

[73] Assignee: Snap-on Incorporated, Kenosha, Wis.

[21] Appl. No.: 293,082

[22] Filed: Aug. 19, 1994

Related U.S. Application Data

[62] Division of Ser. No. 78,044, Jun. 18, 1993, Pat. No. 5,369,959.

[51] Int. Cl.6 ............................................. F25B 47/00
[52] U.S. Cl. ........................................... 62/85; 62/149
[58] Field of Search ........................... 62/475, 195, 85; 135/487.5, 624.14, 624.15

[56] References Cited

U.S. PATENT DOCUMENTS

| | | |
|---|---|---|
| 4,417,451 | 11/1983 | Spauschus . |
| 4,484,453 | 11/1984 | Niess . |
| 4,531,375 | 7/1985 | Zinsmeyer ............................. 62/195 |
| 4,982,578 | 1/1991 | Heffner et al. . |
| 5,005,369 | 9/1991 | Manz . |
| 5,031,410 | 7/1991 | Plzak et al. . |
| 5,062,273 | 11/1991 | Lee et al. . |
| 5,063,749 | 11/1991 | Manz . |
| 5,078,756 | 1/1992 | Major et al. . |
| 5,099,653 | 3/1992 | Major et al. . |
| 5,113,927 | 5/1992 | Kedar et al. . |
| 5,127,232 | 7/1992 | Paige et al. . |
| 5,174,124 | 12/1992 | Paige et al. . |
| 5,181,391 | 1/1993 | Manz . |
| 5,189,889 | 3/1993 | Daily . |
| 5,327,741 | 7/1994 | Mason et al. ........................... 62/195 |

Primary Examiner—John M. Sollecito
Attorney, Agent, or Firm—Emrich & Dithmar

[57] ABSTRACT

A refrigerant recycling system includes a recycled refrigerant tank for storing recycled refrigerant, and first and second valves connected in series between the recycled refrigerant tank and atmosphere. In purging non-condensables from the recycled refrigerant tank to atmosphere, a programmed microcontroller holds the first valve open for exposing the pressure transducer to the pressure in the recycled refrigerant tank, and opens the second valve when the measured pressure exceeds a predetermined pressure for purging non-condensables to atmosphere, holding the second valve open until the measured pressure drops below the predetermined pressure. The pressure checking and purging steps are repeated after a short period, as often as necessary until the measured pressure is less than or equal to the predetermined pressure while the second valve is closed and then, after a longer delay, the system goes through one more pressure check and, if necessary, purging operation.

7 Claims, 2 Drawing Sheets

NON-CONDENSABLE PURGE CONTROL FOR REFRIGERANT RECYCLING SYSTEM

This is a divisional of application Ser. No. 08/078,044, filed Jun. 18, 1993, now U.S. Pat. No. 5,369,959.

BACKGROUND OF THE INVENTION

1. Field of the Invention

The present invention relates to refrigerant handling systems and, in particular, to systems for recovering and recycling refrigerant from a cooling system and recharging recycled refrigerant to the cooling system. The invention has particular application to techniques and apparatus for purging non-condensables from the recovered refrigerant.

As used herein "recover" means to remove used refrigerant from equipment and collect it in an appropriate external container. "Recycle" means to reduce the amount of contaminants in used refrigerant so that it can be reused.

2. Description of the Prior Art

Heretofore, when refrigerant-charged refrigeration systems, such as automotive air conditioning systems, were repaired, the refrigerant charge was simply vented to atmosphere to accomplish the repairs. More recently, it has become increasingly important to capture and reuse the refrigerant charge in such refrigeration systems, both to avoid pollution of the atmosphere and to minimize the increasing costs of disposal and replacement of the refrigerant charge.

Means are available for recycling impure, recovered refrigerant and for recharging the recycled refrigerant into the refrigeration system after service or repairs thereto have been completed. One type of impurity which must be removed from recovered refrigerant is non-condensable material, such as air, which can infiltrate the refrigeration system as a result of leaks or the like. The non-condensables can be vented to atmosphere, but care must be taken that, in the process, minimal refrigerant is vented, in order to assure compliance with governmental pollution control regulations. Prior refrigerant recycling systems have utilized manual vent valves, but manual venting of the non-condensables is time-consuming and inaccurate. Some prior systems have utilized automatic venting mechanisms, wherein diaphragm valves are cyclically opened and closed, but such systems are inaccurate, since the valve operation is not related to the amount of non-condensables in the recovered refrigerant.

It is known that refrigerants have characteristic saturation vapor pressures that vary as associated functions of temperature, as long as refrigerant is present in both liquid and vapor phases, such as in the refillable recycled refrigerrant vessel of a refrigerant recycling system. If air or other non-condensables are present in the recycled refrigerant vessel, a differential pressure above the saturation pressure is created, which is proportional to the quantity of non-condensables. Certain prior systems have utilized this relationship for automatically venting the non-condensables. More specifically, the ideal saturated pressure of the refrigerant at a given temperature is determined, and when the actual measured pressure of the refrigerant exceeds that ideal by a predetermined amount, a venting valve is opened. One such arrangement is disclosed in U.S. Pat. No. 5,189,889, in which the vent valve is opened for a predetermined short period of time, typically less than a second, and the process is repeated at varying intervals until the measured pressure drops below the critical level. This purging operation can be relatively time consuming, since the purge valve is open a very small percentage of the time.

Another difficulty with such prior systems is that the pressure sensors required to monitor the actual pressure of the recovered refrigerant are difficult to calibrate. Since calibration requires exposure of the pressure transducer to atmosphere, calibration typically requires disconnection of the pressure transducer from the remainder of the system, which is a time consuming and inconvenient operation.

SUMMARY OF THE INVENTION

It is a general object of the invention to provide an improved non-condensable purge control for a refrigerant recycling system, which avoids the disadvantages of prior purge control techniques while affording additional structural and operating advantages.

An important feature of the invention is the provision of a purge control technique which is completely automatic.

In connection with the foregoing feature, another feature of the invention is the provision of a purge control apparatus of the type set forth, which is accurate and fast-acting.

Still another feature of the invention is the provision of a purge control technique of the type set forth which is based on monitoring of the refrigerant pressure, and which affords simple automatic calibration of the pressure sensor.

A further feature of the invention is the provision of a purge control apparatus for performing the technique of the type set forth.

Yet another feature of the invention is the provision of a purge control apparatus of the type set forth which is of relatively simple and economical construction.

These and other features of the invention are attained by providing apparatus for purging to atmosphere non-condensables from refrigerant in a first volume, the apparatus comprising: a pressure transducer for producing a pressure signal indicative of a pressure to which the transducer is exposed, first valve means coupled between the transducer and the first volume and operable between an open condition providing communication between the first volume and the transducer for exposing the transducer to the pressure in the first volume and a closed condition isolating the transducer from the first volume, second valve means coupled between the transducer and atmosphere and operable between an open condition permitting flow of non-condensables to atmosphere and a closed condition isolating the transducer from atmosphere, and control means coupled to the transducer and to the first and second valve means, the control means being operative when the first valve means is in its open condition for operating the second valve means to its open condition when the pressure measured by the transducer exceeds the predetermined pressure.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
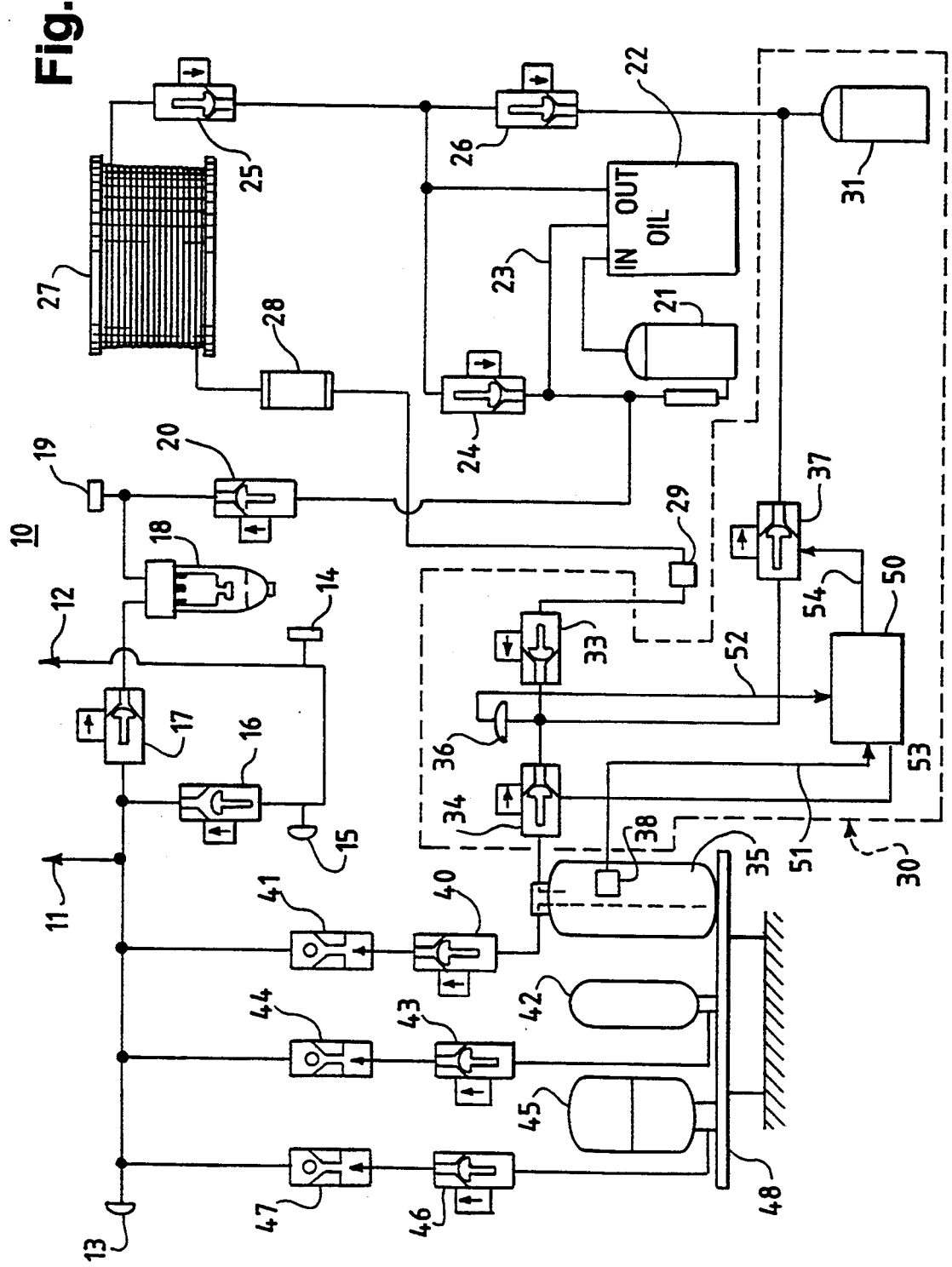
FIG. 1 is a fluidic schematic and electronic functional block diagram of a refrigerant recycling system incorporating a purge control apparatus constructed in accordance with and embodying the features of the present invention.

Referring to FIG. 1, there is illustrated a refrigerant recycling system generally designated by the numeral 10, and incorporating a purge control mechanism 30 in accordance with the present invention. The recycling system 10 includes low pressure and high pressure coupling hoses 11 and 12 which are, respectively, adapted to be coupled to the suction and discharge fittings of the compressor of an associated refrigeration system (not shown), such as an automotive air conditioning system. The low pressure coupling hose 11 communicates with a low pressure transducer 13. The high pressure coupling hose 12 communicates with a high pressure-responsive cutoff switch 14, a high pressure transducer 15 and the inlet of a crossover valve 16. The outlet of the crossover valve 16 communicates with the low pressure coupling hose 11 and with the inlet of a vacuum valve 17, the outlet of which is coupled through a suction separator 18 to a low pressure-responsive cutoff switch 19.

The high pressure-responsive cutoff switch 14 is normally closed and opens at a predetermined high pressure, such as 450 psig, to shut down the system 10 and actuate a suitable warning indication. The low pressure-responsive cutoff switch 19 is normally open and closes at a predetermined pressure, e.g., 20 psig, and reopens at a lower predetermined pressure e.g., 10 psig, to control modulation of the vacuum valve 17 so as to prevent excess oil buildup and flooding in the suction separator 18.

The low pressure-responsive cutoff switch 19 communicates with the outlet of a suction separator valve 20, the inlet of which is coupled to the suction port of a compressor pump 21, the discharge port of which is coupled to the inlet port of an oil separator/reservoir 22, which has an oil port communicating via a conduit 23 with the inlet port of the suction separator valve 20, with the suction port of the compressor pump 21 and with the outlet of a bypass valve 24. The oil separator/reservoir 22 also has an outlet port which communicates with the inlet of the bypass valve 24 and with the outlet of a condenser valve 25 and the inlet of a vent valve 26. The inlet of the condenser valve 25 communicates with the inlet of a condenser 27, the outlet of which communicates with the purge control mechanism 30 through a master filter/drier 28 and a moisture indicator 29.

The purge control mechanism 30 may include a purge bottle 31 which is at atmospheric pressure and which communicates with the outlet of the vent valve 26. The purge control mechanism 30 also includes a liquid valve 33, the inlet of which communicates with the moisture indicator 29, and the outlet of which communicates with the outlet of a vapor valve 34, the inlet of which communicates with the vapor port of a recycled refrigerant tank 35. The outlets of the liquid and vapor valves 33 and 34 also communicate with a purge pressure transducer 36 and with the inlet of a purge valve 37, the outlet of which communicates with the purge bottle 31. A temperature sensor 38 is coupled to the recycled refrigerant tank 35 for sensing the temperature thereof.

The recycling system 10 also includes a recycle valve 40, the inlet of which communicates with the liquid port of the recycled refrigerant tank 35, and the outlet of which communicates through a check valve 41 with the low pressure coupling hose 11. An oil bottle 42 is provided, having an outlet port which communicates with the inlet of a oil valve 43, the outlet of which communicates through a check valve 44 with the low pressure coupling hose 11. There is also provision for a virgin tank 45 containing virgin refrigerant and having an outlet port which communicates with the inlet of a virgin valve 46, the outlet of which communicates through a check valve 47 with the low pressure coupling hose 11. The recycled refrigerant tank 35, the oil bottle 42 and the virgin tank 45 are preferably all located on a scale 48, by means of which the total weight of the contents of these vessels may be monitored.

Preferably, each of the valves 16, 17, 20, 24–26, 33, 34, 37, 40, 43 and 46 is a solenoid valve which is electrically actuated between open and closed conditions in a known manner. Most of the electrical circuitry is not shown, to simplify the drawing.

The recycling system 10 also includes a microprocessor in the nature of a microcontroller 50, which operates under stored program control. The microcontroller 50 is electrically connected by lines 51, 52, 53 and 54, respectively, to the temperature sensor 38, the purge pressure transducer 36 and the solenoids of the vapor valve 34 and the purge valve 37. It will be appreciated that the microcontroller 50 is also electrically connected to the solenoids of each of the other valves 16, 17, 20, 24–26, 33, 40, 43 and 46, and to the pressure transducers 13 and 15, by suitable connections (not shown). All of the valves are normally closed, with the exception of the crossover valve 16, which is normally open. In this regard, the term "normally closed" means that there is normally no flow through the valve and its solenoid is not energized, whereas "normally open" signifies that there is normally flow through the valve when its solenoid is normally not energized.

Preferably, the recycling system 10 also includes a suitable control panel (not shown) which may include control switches and various indicator displays. However, these control elements and displays are not disclosed, since they form no part of the present invention.

It will be appreciated that the recycling system 10 is utilized to recover refrigerant from an associated refrigeration system, recycle the refrigerant, i.e., remove contaminants therefrom, and recharge the recycled refrigerant along with virgin refrigerant, if necessary, to the refrigeration system. The basic recycling and recharging operations are well understood by those skilled in the art and will not be explained in detail, since they form no part of the present invention.

In general, in recovering refrigerant from the associated refrigeration system, the vacuum valve 17, the suction separator valve 20, the condenser valve 25, the liquid valve 33 and the vapor valve 34 are all open and the compressor pump 21 is turned on. The crossover valve 16 is closed if the discharge pressure exceeds a first predetermined pressure, e.g., 130 psig, and is opened if the discharge pressure is less than a second predetermined pressure, e.g., 110 psig. Between these two predetermined pressures the valve 16 maintains its current state. The compressor pump 21 draws refrigerant from the associated refrigeration system through the valves 17 and 20 and pumps it to the oil separator/reservoir 22, and thence through the valve 25, the condenser 27, and the valves 33 and 34 to the recycled refrigerant tank 35. The pump 21 runs until the suction and discharge pressures as determined by the transducers 13 and 15 are both less than a predetermined pressure, e.g., five inches of mercury. The system then waits for approximately two minutes (depending upon ambient temperature) for a rise in pressure, in order to allow the refrigeration system to boil off any additional residual refrigerant. If the recycling system 10 detects a lack of vacuum, i.e., a positive pressure on suction or discharge greater than atmosphere, the compressor pump 21 is then restarted and the recycling system 10 continues to recover and recycle refrigerant until both the suction and discharge pressures are below five inches of mercury.

The suction separator 18 includes a desiccant bag to remove moisture, and it also functions to separate and collect any oil and solids in the recovered refrigerant. The refrigerant vapor is then pulled from the bowl of the suction separator 18 by the compressor pump 21, which pressurizes it and passes it through the oil separator/reservoir 22. Inside the oil separator/reservoir 22 is a filter through which the recovered vapor passes before it exits. Any oil in the refrigerant from the compressor pump 21 will settle in the bottom of the oil separator/reservoir 22. The recovered refrigerant vapor then passes through the condenser 27 where it is cooled and converted to a liquid, which then passes through the master filter/drier 28, which includes desiccants to remove any remaining moisture and impurities, the refrigerant then flowing to the recycled refrigerant tank 35.

Figure 2:
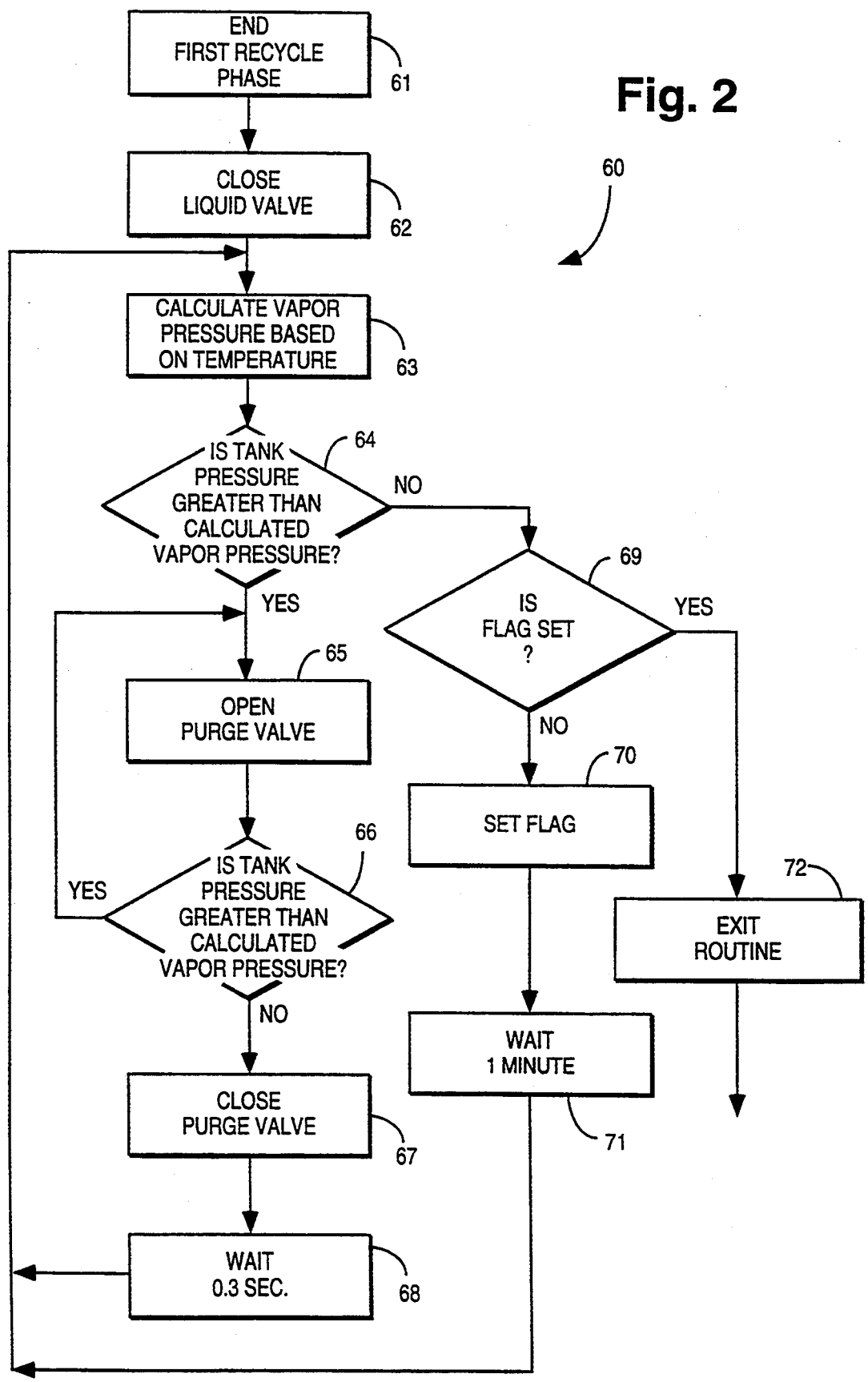
FIG. 2 is a flow diagram of a software program for controlling the operation of the microprocessor of the system of FIG. 1.

Before the recycled refrigerant can be recharged to the associated refrigeration system, non-condensables must be purged therefrom, and this is accomplished by the purge control mechanism 30 in accordance with the present invention. Referring also to FIG. 2, there is illustrated a flow chart for a purge control routine 60 of the program for the microcontroller 50. This routine is entered at 61 with the end of the first recycle phase, described above. The system then first closes the liquid valve 33 and the purge valve 37 remains closed and the vapor valve 34 remains open at 62, thereby exposing the purge pressure transducer 36 to the pressure in the recycled refrigerant tank 35 and preparing the system for the purge operation.

Then, based on the temperature of the recycled refrigerant as measured by the temperature sensor 38 and on the saturated vapor pressure of the refrigerant, the microcontroller 50 calculates the ideal vapor pressure of the refrigerant plus a small offset, i.e., the pressure that the refrigerant would exert if it contained almost no non-condensables. The program then drops to 64 and checks to see if the actual pressure in the recycled refrigerant tank 35, as measured by the purge pressure transducer 36, is greater than a predetermined calculated vapor pressure, depending on the refrigerant being recycled, which may be a few psig above the ideal pressure, to provide a margin of safety to ensure that minimal refrigerant is purged. If the tank pressure exceeds the calculated vapor pressure, this indicates the presence of non-condensables, and the program therefore drops to 65 to open the purge valve 37 and permit the non-condensables to flow to the purge tank 31 through the vapor valve 34 and the purge valve 37. The program then again checks at 66 to see if the tank pressure is still greater than the predetermined pressure. If it is, the program continues looping through steps 65 and 66 until the tank pressure no longer exceeds the predetermined pressure, at which point the program drops to 67 and closes the purge valve 37. The program then, at 68, waits for a predetermined time period as determined by an internal timer of the microcontroller 50, preferably 0.3 seconds, and then returns to step 63 to again recalculate the vapor pressure and recheck the tank pressure.

Thus, it will be appreciated that, initially, when the program first enters step 64, it will hold the purge valve 37 open until the measured pressure in the recycled refrigerant tank 35 drops to the predetermined pressure. However, the pressure readings taken by the pressure transducer 36 when the purge valve 37 is open are inaccurate, since they are skewed by the flow past the pressure transducer 36. Thus, the program rechecks the pressure 0.3 seconds after the purge valve 37 has been closed, so that it can get an accurate pressure reading under static conditions. Thus, once the measured pressure has dropped to a value close to the predetermined value, the program modulates the purge valve 37, alternately opening the valve to purge non-condensables and then closing it for 0.3 seconds to take another pressure reading.

The program continues cycling in this manner until, at step 64, the measured tank pressure does not exceed the calculated vapor pressure with the purge valve 37 closed. The program then drops to decision 69 to check to see if a flag is set, i.e., to determine whether or not this is the first time that this condition has been registered. If the flag is not set, the program sets the flag at 70 and then, at 71, waits one minute as determined by an internal timer in the microcontroller 50, and then returns to step 63 to recalculate the vapor pressure and recheck the tank pressure. This one-minute delay allows the temperature of the recycled refrigerant to stabilize to compensate for any accumulated latent heat from the recovery compressor pump 21, and then the program repeats the purge sequence until, at step 64, the measured tank pressure no longer exceeds the predetermined pressure with the purge valve 37 closed. Then, when the program moves to step 69, the flag is set, indicating that the system has already gone through its secondary purge operation, so the program then exits the routine at 72.

A significant aspect of the invention is that the purge routine 60 serves to initially rapidly purge the non-condensables until the measured recycled refrigerant tank pressure approaches the predetermined pressure, and then the program goes into a modulating mode for the purge valve 37, periodically turning it off for a very short period of time to allow accurate pressure measurements to be taken under static conditions, so that more precise readings can be taken when the pressure is close to the predetermined pressure. There results a very rapid and very accurate purging operation.

Another significant aspect of the invention is that it facilitates automatic calibration of the purge pressure transducer 36 (as well as the pressure transducers 13 and 15). In order to calibrate the pressure transducer 36, it must be exposed to atmosphere without interference by other pressure sources. Thus, the present invention significantly locates the pressure transducer 36 between the liquid and vapor valves 33 and 34, both of which can be closed, to respectively isolate the transducer 36 from the recycled refrigerant tank 35 and from the condenser 27 while, at the same time, the transducer 36 can be exposed to atmosphere by opening the purge valve 37.

Thus, in a calibration mode, the system 10 closes the valves 33 and 34 and opens the valve 37 and then records the pressure measured by the pressure transducer 36 to determine the transducer reading at true atmospheric pressure. The amount by which this reading differs from nominal atmospheric pressure is the calibration error, and the system 10 can automatically adjust all subsequent readings by that amount. Thus, calibration is effected automatically and quickly without the need for disconnecting the pressure transducer 36 from the remainder of the system. This feature becomes very important when the recycling system 10 is being used at locations above or below sea level, since the nominal atmospheric pressure will normally be assigned based on sea level altitude.

After the purge operation has been completed, the recycling system 10 can be used to recharge the associated refrigeration system. In this regard, the oil valve 43 is opened and oil from the oil bottle 42 is dispensed into the refrigeration system until the scale 48 indicates that the correct weight has been dispensed, depending upon the requirements of the vehicle being serviced. Then, the system closes the oil valve 43 and opens the recycle valve 40 to recharge recycled refrigerant from recycled refrigerant tank 35 into the associated refrigeration system. This continues until the scale 48 indicates that the correct amount has been dispensed or until a float switch in the tank 35 indicates that there is no more recycled refrigerant left in the tank 35. The recycling system 10 will then automatically switch over to the virgin tank 45 by closing the recycle valve 40 and opening the virgin valve 46 until the proper amount of refrigerant has been dispensed. It will be appreciated that the system 10 also has the ability to initially select the virgin tank 45 for charging instead of the recycled refrigerant tank 35.

It will be appreciated that the recycling system 10 has the capability of performing other functions and operating in other modes, but they are not described herein, since they are not pertinent to the present invention.

In view of the foregoing, it can be seen that there has been provided an improved system and method for purging non-condensables to atmosphere from a recycled refrigerant vessel, the system being characterized by speed and accuracy of the purging operation and accommodating automatic calibration of the pressure transducer.

We claim:

1. A method for purging non-condensables from refrigerant in a first volume through a valve to atmosphere, said method comprising the steps of: measuring the pressure in the first volume, comparing the measured pressure to a predetermined pressure, opening the valve if it is closed when the measured pressure exceeds the predetermined pressure, closing the valve if it is open when the measured pressure does not exceed the predetermined pressure, and waiting a predetermined time period after closing of the valve and then repeating the measuring and comparing steps.

2. The method of claim 1, wherein the valve is held open as long as the measured pressure exceeds the predetermined pressure.

3. The method of claim 1, wherein the predetermined time period is less than one second.

4. The method of claim 3, wherein the predetermined time period is substantially 0.3 second.

5. The method of claim 1, and further comprising the step of waiting a predetermined second time after performance of the comparing step if, at the performance of the comparing step, the valve is closed and the measured pressure does not exceed the predetermined pressure, and then repeating the measuring and comparing steps.

6. The method of claim 1, and further comprising the step of measuring the temperature in the first volume.

7. The method of claim 6, and further comprising the step of calculating the predetermined pressure based on the measured temperature and the type of refrigerant in the first volume.

* * * * *

UNITED STATES PATENT AND TRADEMARK OFFICE
CERTIFICATE OF CORRECTION

PATENT NO. : 5,412,955
DATED : May 9, 1995
INVENTOR(S) : Dean P. Pfefferle et al.

It is certified that error appears in the above-indentified patent and that said Letters Patent is hereby corrected as shown below:

On the title page;
[75] Dean P. Pfefferle should be added before "Roger L. Husarik"

Signed and Sealed this

Seventh Day of May, 1996

Attest:

BRUCE LEHMAN

Attesting Officer        Commissioner of Patents and Trademarks